(12) United States Patent
Kim et al.

(10) Patent No.: US 9,391,321 B2
(45) Date of Patent: Jul. 12, 2016

(54) NEGATIVE-ELECTRODE ACTIVE MATERIAL FOR LITHIUM SECONDARY BATTERY AND METHOD OF PREPARING THE SAME

(75) Inventors: Ki-Tae Kim, Daejeon (KR); Soon-Ho Ahn, Daejeon (KR); Je-Young Kim, Daejeon (KR); Jaephil Cho, Ulsan (KR); Mi-Hee Park, Gyeongsangnam-do (KR)

(73) Assignees: LG Chem, Ltd. (KR); UNIST Academy-Industry Research Corporation (KR)

( * ) Notice: Subject to any disclaimer, the term of this patent is extended or adjusted under 35 U.S.C. 154(b) by 1101 days.

(21) Appl. No.: 13/378,729

(22) PCT Filed: Jun. 17, 2010

(86) PCT No.: PCT/KR2010/003910
§ 371 (c)(1),
(2), (4) Date: Dec. 16, 2011

(87) PCT Pub. No.: WO2010/147404
PCT Pub. Date: Dec. 23, 2010

(65) Prior Publication Data
US 2012/0094181 A1    Apr. 19, 2012

(30) Foreign Application Priority Data

Jun. 18, 2009 (KR) .......................... 10-2009-0054252

(51) Int. Cl.
*H01M 4/38*    (2006.01)
*H01M 4/134*   (2010.01)
*H01M 10/052*  (2010.01)

(52) U.S. Cl.
CPC ............... *H01M 4/38* (2013.01); *H01M 4/134* (2013.01); *H01M 4/386* (2013.01); *H01M 10/052* (2013.01); *Y02E 60/122* (2013.01); *Y02P 70/54* (2015.11)

(58) Field of Classification Search
CPC .................................. H01M 4/587; H01M 4/38
USPC ........................................................ 429/231.8
See application file for complete search history.

(56) References Cited

U.S. PATENT DOCUMENTS

| 6,440,610 B1 | 8/2002 | Sheem et al. |
| 7,189,476 B1 | 3/2007 | Macklin et al. |

(Continued)

FOREIGN PATENT DOCUMENTS

| CN | 101439972 | * | 5/2009 | ............ C04B 35/515 |
| CN | 101439972 A |   | 5/2009 | |

(Continued)

OTHER PUBLICATIONS

Chinese Office Action dated Jun. 10, 2014.
(Continued)

*Primary Examiner* — Ula C Ruddock
*Assistant Examiner* — Archer Dudley
(74) *Attorney, Agent, or Firm* — Lerner, David, Littenberg, Krumholz & Mentlik, LLP

(57) ABSTRACT

The present invention relates to negative-electrode active material for a lithium secondary battery exhibiting excellent capacity property and cycle life property, a method of preparing the same, and a lithium secondary battery using the negative-electrode active material, wherein the negative-electrode active material for a lithium secondary battery comprises a nanotube having a tube shape defined by an outer wall with a thickness of nanoscale, the outer wall of the nanotube comprises at least one non-carbonaceous material selected from the group consisting of silicon, germanium and antimony, and an amorphous carbon layer with a thickness of 5 nm or less is formed on the outer wall of the nanotube.

20 Claims, 7 Drawing Sheets

(56) References Cited

U.S. PATENT DOCUMENTS

| | | | |
|---|---|---|---|
| 2003/0129497 A1* | 7/2003 | Yamamoto | H01M 4/131 429/246 |
| 2007/0243469 A1 | 10/2007 | Kim et al. | |
| 2008/0044732 A1* | 2/2008 | Salot | B82Y 30/00 429/322 |
| 2008/0166634 A1* | 7/2008 | Kim et al. | 429/218.1 |
| 2008/0280207 A1 | 11/2008 | Patoux et al. | |
| 2009/0004564 A1* | 1/2009 | Ishida | B82Y 30/00 429/219 |
| 2009/0075171 A1* | 3/2009 | Feng | H01M 4/133 429/209 |
| 2009/0117468 A1* | 5/2009 | Eom | 429/231.8 |
| 2010/0092868 A1* | 4/2010 | Kim et al. | 429/231.8 |
| 2010/0159331 A1* | 6/2010 | Lee et al. | 429/231.8 |

FOREIGN PATENT DOCUMENTS

| | | | | |
|---|---|---|---|---|
| EP | 2045213 A1 | 4/2009 | | |
| JP | 2002-334697 A | 11/2002 | | |
| JP | 2002-358954 A | 12/2002 | | |
| JP | 2007165079 | * | 6/2007 | H01M 4/02 |
| KR | 20010055503 A | 7/2001 | | |
| KR | 20070041900 | 4/2007 | | |
| KR | 20070076686 A | 7/2007 | | |
| KR | 10-0861793 | 10/2008 | | |
| WO | 2007/061945 A2 | 5/2007 | | |

OTHER PUBLICATIONS

International Search Report, PCT/KR2010/003910, dated Feb. 1, 2011.

* cited by examiner

NEGATIVE-ELECTRODE ACTIVE MATERIAL FOR LITHIUM SECONDARY BATTERY AND METHOD OF PREPARING THE SAME

CROSS REFERENCE TO RELATED APPLICATIONS

The present application is a national phase entry under 35 U.S.C. §371 of International Application No. PCT/KR2010/003910, filed Jun. 17, 2010, published in Korean, which claims priority from Korean Patent Application No. 10-2009-0054252, filed Jun. 18, 2009. The disclosures of said applications are incorporated by reference herein.

BACKGROUND OF THE INVENTION (a) Field of the Invention

This disclosure relates to negative-electrode active material for a lithium secondary battery, and a method of preparing the same. More particularly, this disclosure relates to negative-electrode active material for a lithium secondary battery exhibiting excellent capacity property and cycle life property, a method of preparing the same, and a lithium secondary battery using the negative-electrode active material.

(b) Description of the Related Art

A battery generates electric power using material capable of electrochemical reactions in a positive- and a negative-electrode. A representative example of the battery is a lithium secondary battery which generates electrical energy by chemical potential change when lithium ions are intercalated/deintercalated in a positive- and a negative-electrode.

The lithium secondary battery is prepared by using material capable of reversible intercalation/deintercalation of lithium ions as positive- and negative-electrode active material, and filling organic electrolyte or polymer electrolyte between the positive- and negative-electrode.

As positive-electrode active material of a lithium secondary battery, a lithium complex metal compound is used, and for example, complex metal oxides such as $LiCoO_2$, $LiMn_2O_4$, $LiNiO_2$, $LiNi_{1-x}Co_xO_2$ ($0<x<1$), $LiMnO_2$, and the like are studied.

As negative-electrode active material of a lithium secondary battery, graphite capable of intercalation/deintercalation of lithium is representatively applied. However, since an electrode using the graphite has low charge capacity of 365 mAh/g (theoretical value: 372 mAh/g), there has been a limit to provide a lithium secondary battery exhibiting excellent capacity property.

Thus, inorganic active material such as silicon (Si), germanium (Ge) or antimony (sb) is being studied. The inorganic active material, particularly silicon-based negative-electrode active material may exhibit very high lithium binding amount (theoretical maximum value: $Li_{4.1}Si$), which corresponds to a theoretical capacity of about 4200 mAh/g.

However, the inorganic negative-electrode active material such as silicon-based negative-electrode active material causes considerable volume change at intercalation/deintercalation of lithium, i.e., charge/discharge of a battery, and thus, pulverization may occur. As a result, pulverized particle may be aggregated, and thus, negative-electrode active material may be electrically deintercalated from a current collector, which may cause loss of reversible capacity during a long cycle. For example, the capacity of a lithium secondary battery using silicon-based negative-electrode active material may become similar to the capacity of a battery using graphite after about 12 cycles. For this reason, a lithium secondary battery including previously known inorganic negative-electrode active material, for example, silicon-base negative-electrode active material, has disadvantages of low cycle life property and capacity retention ratio, despite of advantages according to high charge capacity.

To overcome these problems, there has been an attempt to use a complex of carbon and silicon-based nanoparticles as negative-electrode active material. However, this negative-electrode active material also exhibits relatively high loss of reversible capacity during a long cycle, and thus, insufficient cycle life property and capacity retention ratio. And, capacity property is not sufficient due to a substantial content of carbon included in the nanocomplex

SUMMARY OF THE INVENTION

The present invention provides negative-electrode active material for a lithium secondary battery exhibiting excellent capacity property and cycle life property.

The present invention also provides a method for preparing the negative-electrode active material for a lithium secondary battery.

The present invention also provides a lithium secondary battery comprising the negative-electrode active material for a lithium secondary battery.

The present invention provides negative-electrode active material for a lithium secondary battery comprising a nanotube having a tube shape defined by an outer wall with a thickness of nanoscale, wherein the outer wall of the nanotube comprises at least one non-carbonaceous material selected from the group consisting of silicon, germanium and antimony, and an amorphous carbon layer with a thickness of about 5 nm or less is formed on the outer wall of the nanotube.

In the negative-electrode active material, the nanotube may have an outer wall thickness of about 10~30 nm, and an average cross-section diameter of about 180~300 nm. And, the nanotube may have a length of about 1~50 μm.

And, the nanotube may have an outer wall thickness of about 20~60 nm, and an average cross-section diameter of about 200~350 nm, after performing 200 cycles of charge/discharge.

And, the amorphous carbon layer may be formed on the outer side and/or inner side of the outer wall, and have a thickness of 1~5 nm.

And, the outer wall may include amorphous non-carbonaceous material on the outer side, and include non-carbonaceous material having a cubic crystal form on the inner side.

After performing 200 cycles of charge/discharge, the outer wall may have a morphology where nanocrystals the non-carbonaceous material are dispersed in an amorphous matrix of the non-carbonaceous material, and the nanocrystals of the non-carbonaceous material may have an average particle diameter of about 1~10 nm.

The outer wall of the nanotube may include substantially pure non-carbonaceous material containing less than about 100 ppm of impurities The negative-electrode active material may comprise a nanotube bundle including a plurality of nanotubes.

The present invention also provides a method for preparing negative-electrode active material for a lithium secondary battery comprising: modifying at least one non-carbonaceous material selected from the group consisting of silicon, germanium and antimony with an organic functional group; immersing a porous inorganic oxide membrane in a solution of the non-carbonaceous material modified with the organic functional group; heat-treating the immersed porous inorganic oxide membrane; and removing the porous inorganic oxide membrane.

In the method, the organic functional group may be an organic group represented by $C_nH_m$, and n and m may be respectively an integer of 1 or more. And, the organic functional group may be selected from the group consisting of a C1-30 aliphatic organic group, a C3-30 cycloaliphatic organic group and a C6-30 aromatic organic group.

The porous inorganic oxide membrane may include at least one selected from the group consisting of silica, alumina, titania, ceria and zirconia.

The heat-treatment may be conducted at about 600~1000, and the method may further comprise drying the porous inorganic oxide membrane immersed in the solution of the non-carbonaceous material at about 100~200 before the heat treatment.

The removing of the porous inorganic oxide membrane may be conducted using basic or acidic material.

The present invention also provides a lithium secondary battery comprising: a positive-electrode including positive-electrode active material; a negative-electrode including the above explained negative-electrode active material; and electrolyte.

The details of other embodiments are included in the detailed description of the invention below.

DETAILED DESCRIPTION OF THE EMBODIMENTS

Hereinafter, embodiment of the invention will be explained in detail. However, these are presented only to illustrate the invention, the invention is not limited thereto, the present invention is defined only by the claims.

According to one embodiment of the invention, negative-electrode active material for a lithium secondary battery comprises a nanotube.

The nanotube includes an outer wall with a thickness of nanoscale, and has a tube shape defined by the outer wall. And, the outer wall of the nanotube comprises non-carbonaceous material selected from silicon, germanium, antimony, and a combination thereof, preferably it may comprise the specific non-carbonaceous material only.

Figure 1:
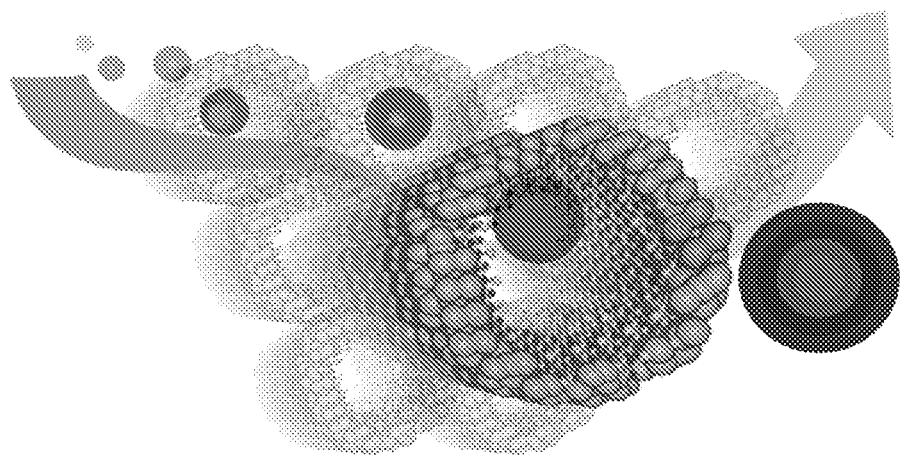
FIG. 1 is a schematic diagram showing a nanotube included in the negative-electrode active material for a lithium secondary battery according to one embodiment of the invention.

More specifically, the nanotube may have a nanostructure of a pipe or tube shape that is surrounded by the outer wall comprising the specific non-carbonaceous material, of which one side or both sides are open. The nanotube of a tube shape surrounded by the outer wall may have an average diameter of nanoscale, and a length of nanoscale or microscale. And, the shape of the cross section of the nanotube may be an empty circle, an oval or a polygon, and the like (See FIG. 1 and FIG. 2b). FIG. 1 is a schematic diagram of the nanotube.

Unless explicitly described such as "after performing charge/discharge" herein, the cross section (average) diameter of the nanotube, the thickness of the outer wall, length or other properties may refer to initial properties of the nanotube before performing charge/discharge of a lithium secondary battery comprising the negative-electrode active material.

Meanwhile, the inventors found out that a nanotube having the above explained structure and morphology may be obtained by the following preparation method. Since the nanotube has a tube shape surrounded by a thin outer wall of nanoscale, a space within the outer wall and the nanotube surrounded by the outer wall may effectively absorb considerable volume change of negative-electrode active material, for example, a specific non-carbonaceous material such as silicon, generated at charge/discharge of a battery.

Therefore, in negative-electrode active material comprising the nanotube, pulverization and deintercalation due to considerable volume change of active material at charge/discharge of a lithium secondary battery may be largely reduced, and thus, excellent cycle life property and capacity retention ratio may be exhibited.

And, the nanotube comprises specific non-carbonaceous material selected from silicon, germanium or antimony, and the like, which shows relatively high lithium binding amount (for example, theoretical maximum value of silicon: $Li_{4.1}Si$) as a main ingredient. In addition, since the nanotube has a large contact area with electrolyte over the inner side the outer side due to the structural property, doping and dedoping of lithium may actively occur over the large surface area.

Therefore, the negative-electrode active material and a lithium secondary battery comprising the same may exhibit more improved capacity property.

And, on the outer wall defining the nanotube, an amorphous carbon layer that is derived from an organic functional group used during the preparation process to be explained later may be formed, and the amorphous carbon layer may have a thickness of about 5 nm or less, for example about 0 to 5 nm, preferably about 1 to 5 nm, more preferably about 1 to 3 nm.

During intercalation/deintercalation of lithium ion at charge/discharge of a lithium secondary battery, if bare particles of the non-carbonaceous material that is a main ingredient of the outer wall are continuously exposed, the active surface of the active material comprising the non-carbonaceous material may be continuously passivated, which may cause capacity loss of a battery. However, if an amorphous carbon layer is formed on the outer wall of the nanotube, the carbon layer may reduce direct contact of the specific non-carbonaceous material and electrolyte and reduce the above explained capacity loss. Thus, negative-electrode active material comprising the nanotube may have further improved capacity retention ratio and capacity property, and the like.

And, the amorphous carbon layer may be formed on the outer side and/or inner side of the outer wall with a significantly thin thickness compared to the outer wall of the nanotube, about 5 nm or less, for example, about 0 to 5 nm, preferably about 1 to 5 nm, more preferably about 1 to 3 nm.

As explained, in the negative-electrode active material, only a carbon layer with a very thin thickness may be formed on the nanotube comprising non-carbonaceous material such as silicon, and the like as a main ingredient, or such a carbon layer may not be included. The structure is novel and entirely different from the structure of previously known nanotube, for example, the structure of a carbon nanotube comprising a silicon layer, and the structure of nanotube having a carbon layer of a thin thickness has been unknown.

Due to the thin thickness of the carbon layer, direct contact of the non-carbonaceous material and electrolyte may be effectively reduced, and deterioration of capacity property due to increase in the content of carbon included in negative-electrode active material may be minimized.

Meanwhile, in the negative-electrode active material according to one embodiment of the invention, the outer wall of the nanotube comprises substantially pure non-carbonaceous material only, and it may comprise silicon, germanium or antimony only. The description that the nanotube comprises "substantially pure non-carbonaceous material" means that impurities may be included in the content of less than FT-IR detection limit, for example, less than about 100 ppm, preferably less than about 50 pm, more preferably about 0 to 30 ppm. The impurities may include any inorganic substance or inorganic oxide that cannot be bonded with lithium or inorganic oxide such as alumina used during the preparation process of a nanotube, except specific non-carbonaceous material of silicon, germanium or antimony that makes up the nanotube. However, the outer wall of the nanotube may or may not include a chemical bond (for example, Si—O, and the like) of the non-carbonaceous material and oxygen, due to contact with air during the preparation process, and the like, and it may be more preferable that the chemical bond of the non-carbonaceous material and oxygen is not included in a detectable effective amount.

As explained, since the outer wall and the nanotube comprise substantially pure non-carbonaceous material, for example, at least one of silicon, germanium or antimony, the negative-electrode active material and lithium secondary battery may exhibit more excellent capacity property due to the property of the non-carbonaceous material, for example, high lithium binding amount, and the like.

And, the outer wall of the nanotube may have a thickness of about 40 nm or less, for example about 10~30 nm, preferably about 15~30 nm. And, the nanotube may have an average diameter of the cross section of about 180~300 nm, more specifically about 180~280 nm, preferably about 200~280 nm. As the nanotube has an outer wall thickness and average cross section diameter within the above ranges, a space within the outer wall and the nanotube surrounded by the outer wall may more effectively absorb considerable volume change of active material generated at charge/discharge of a battery. Thereby, the negative-electrode active material and lithium secondary battery may exhibit more excellent cycle life property and capacity retention ratio.

Further, as the result of the analysis of the inventors, it was confirmed that the nanotube may have a tube shape having a long length compared to the cross section diameter, wherein the length may be of micro scale, for example about 1~50 μm, preferably about 10~50 μm or about 1~30 μm.

And, the nanotube may have an outer wall thickness of about 70 nm or less, for example, about 20~60 nm, preferably about 30~60 nm, after performing 200 charge/discharge. And, the nanotube may have an average cross section diameter of about 200~350 nm, more specifically about 200~330 nm, preferably about 200~300 nm, after performing the charge/discharge. As the outer wall thickness and average diameter of the nanotube within the above ranges are maintained even after performing charge/discharge of a lithium secondary battery, excellent absorption effect for volume change of active material may be maintained, and the negative-electrode active material and lithium secondary battery may exhibit more excellent cycle life property, and the like.

And, even if the outer wall thickness and the cross section diameter of nanotube are slightly changed after performing charge/discharge, the morphology or structure of the nanotube is maintained without considerable change, and thus, cycle property, and the like of the negative-electrode active material may be maintained excellent.

Meanwhile, as the result of confirmation by the inventors, it was observed that amorphous non-carbonaceous material is included on the outer side of the outer wall of the nanotube, and thus, at least a part of the outer side may be covered with the amorphous non-carbonaceous material, and that non-carbonaceous material having a cube shape such as diamond exists on the inner side of the outer wall.

Further, after performing 200 cycles of charge/discharge, the outer wall of the nanotube may have a morphology where nanocrystals of the non-carbonaceous material are dispersed in an amorphous matrix of the non-carbonaceous material, wherein the nanocrystals may have an average particle diameter of about 1~10 nm, preferably about 2~7 nm, more preferably 3~6 nm. Thereby, volume change of active material by charge/discharge of a battery may be more effectively absorbed due to the formation of the amorphous matrix, and thus, the negative-electrode active material and lithium secondary battery may exhibit more excellent cycle life property, and the like.

Figure 2A:
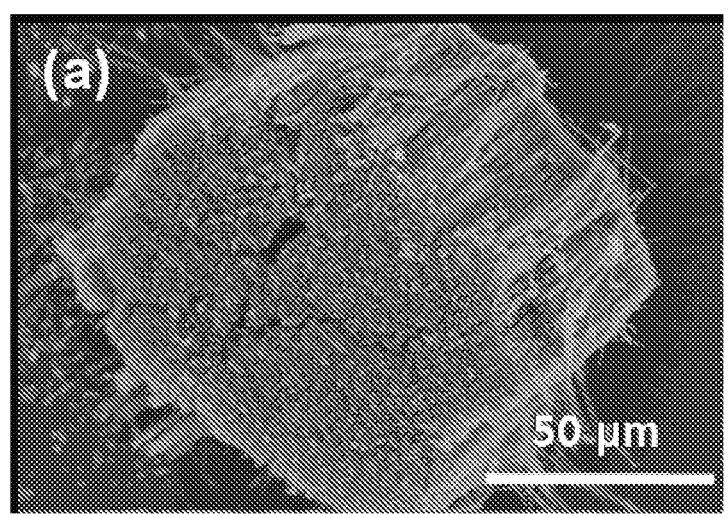
FIGS. 2a to 2f are SEM photograph, TEM image, and X-ray diffraction pattern of the nanotube included in the negative-electrode active material of Example 1.
Figure 2B:
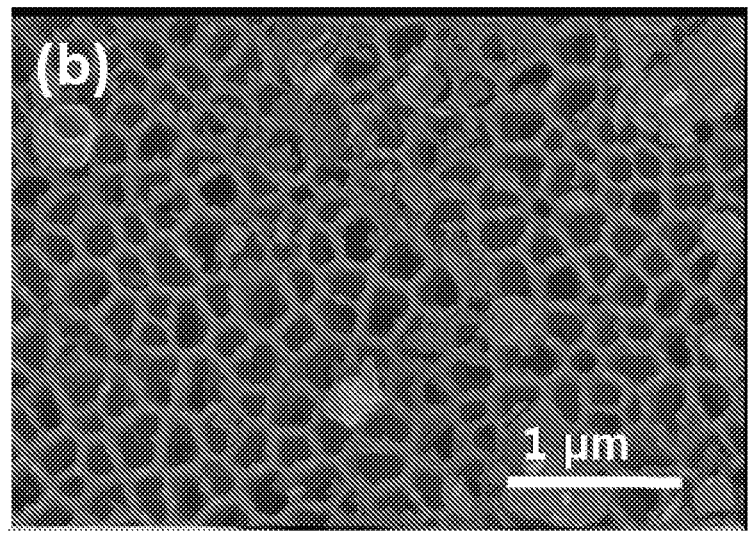
Figure 2C:
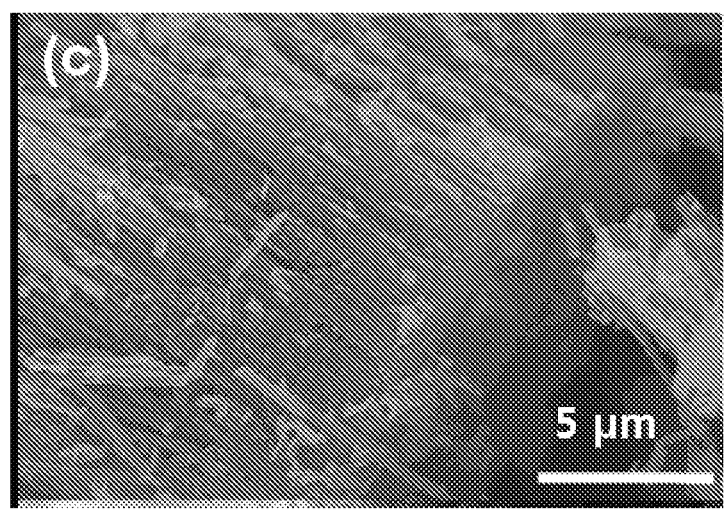

Meanwhile, the negative-electrode active material according to one embodiment of the invention may comprise the nanotubes in a separated form, or it may comprise a nanotube bundle including a plurality of nanotubes. The nanotube bundle may have a shape wherein a plurality of nanotubes are gathered in a bundle shape and regularly arranged and bonded, as shown in FIGS. 2a to 2c.

Since a plurality of nanotubes are regularly arranged and bonded in the nanotube bundle, electrolyte may be filled in the interior space of the nanotubes. Therefore, as the negative-electrode active material comprises the nanotube bundle, the negative-electrode active material may have an increased contact area with electrolyte, and thus, doping and dedoping of lithium may actively occur. And, electrolyte of a lithium secondary battery may be uniformly diffused at a part joining with the negative-electrode, and the regularly arranged nanotubes may shorten the moving path of lithium ion and electrons at charge/discharge.

Therefore, the negative-electrode active material and a lithium secondary battery comprising the same may exhibit more improved capacity property and high rate property.

The above explained negative-electrode active material for a lithium secondary battery may be mixed with conductive material, a binder and a solvent, and the like, and provided as a negative-electrode active material composition, as common active material, and the composition may be applied to a negative-electrode of a lithium secondary battery by coating on a current collector, and the like.

Meanwhile, according to another embodiment of the invention, a method for preparing the above explained negative-electrode active material for a lithium secondary battery is provided. The method may include modifying at least one non-carbonaceous material selected from the group consisting of silicon, germanium and antimony with an organic functional group; immersing a porous inorganic oxide membrane in a solution of the non-carbonaceous material modified with the organic functional group; heat-treating the immersed porous inorganic oxide membrane; and removing the porous inorganic oxide membrane.

As the result of experiment of the inventors, it was found that the above explained nanotube may be formed and the negative-electrode active material for a lithium secondary battery according to one embodiment of the invention may be prepared by the above preparation method. More specifically, in the preparation method, an outer wall including the specific non-carbonaceous material may be formed along the inner wall of the pores of the porous inorganic oxide membrane, and if the porous inorganic oxide membrane is removed, the above explained nanotube and negative-electrode active material for a lithium secondary battery comprising the same may be formed. Thus, through the preparation method, negative-electrode active material that may effectively absorb volume change of active material at charge/discharge, and yet exhibit excellent capacity and high rate properties compared to large specific surface area may be prepared.

And, as will be explained in detail below, since the organic functional group is decomposed or removed by the heat treatment, only a very thin carbon layer is remained on the nanotube or such a carbon layer may not be remained. Due to the presence of the thin carbon layer, direct contact of the non-carbonaceous material, which is a main ingredient of the nanotube, and electrolyte may be effectively reduced, and deterioration of capacity property due to increase in the content of carbon included in negative-electrode active material may be minimized. Therefore, negative-electrode active material exhibiting excellent properties may be prepared by the above preparation method.

Hereinafter, the preparation method according to another embodiment of the invention will be explained in more detail.

First, non-carbonaceous material such as silicon, germanium or antimony, and the like is modified with an organic functional group, and a solution thereof is formed. If the non-carbonaceous material is modified with the organic functional group, a viscous gel may be initially obtained, and for progression of subsequent process, a solvent is added to the non-carbonaceous material modified with the organic functional group to obtain a solution of the non-carbonaceous material modified with the organic functional group.

If the following preparation process of negative-electrode active material is progressed for the solution, the non-carbonaceous material may form a nanotube, and the organic functional group may be removed or it may form a carbon layer on the nanotube.

The organic functional group for modifying the non-carbonaceous material may include a hydrocarbon organic group represented by $C_nH_m$ (wherein n and m are respectively an integer of 1 or more), specifically a functional group selected from the group consisting of an aliphatic organic group, a cycloaliphatic organic group and an aromatic organic group. For example, the aliphatic organic group may include c C1-30 aliphatic organic group, a C1-30 alkyl group, specifically a C1-15 alkyl group; a C2-30 alkenyl group, specifically C2-18 alkenyl group; or a C2-30 alkynyl group, specifically a C2-18 alkynyl group, the cycloaliphatic organic group may include a C3-30 cycloaliphatic organic group, a C3-30 cycloalkyl group, specifically, a C3-18 cycloalkyl group; c C3-30 cycloalkenyl group, specifically a C3-18 cycloalkenyl group; or a C3-30 cycloalkynyl group, specifically c C5-18 cycloalkynyl group, and the aromatic organic group may include a C6-30 aromatic organic group, a C6-30 aryl group, specifically a C6-18 aryl group. More specific examples of the organic functional group may include a methyl, an ethyl, a propyl, a butyl, a cyclopropyl, a cyclobutyl, a cyclopentyl, a cyclohexyl, a phenyl group, and a combination thereof, but not limited thereto.

A process of modifying the non-carbonaceous material with the organic functional group is well known in this field, and thus, detailed explanations thereof are skipped, but is would be easily understood by one of ordinary knowledge in the art.

And, a solvent for adding to the non-carbonaceous material modified with the organic functional group to form a solution thereof may include a hydrocarbon solvent such as n-hexane, and the like, and any other organic solvents that may dissolve silicon, germanium or antimony to decease the viscosity may be used.

Meanwhile, after forming a solution of the non-carbonaceous material modified with the organic functional group, a porous inorganic oxide membrane is immersed in the solution.

At this time, the porous inorganic oxide membrane includes a plurality of fine pores with a diameter and length corresponding to the cross section diameter and the length of the nanotube to be finally prepared. If the porous inorganic oxide membrane is immersed in the non-carbonaceous material solution, the non-carbonaceous material solution may exist in the fine pores, and if heat treatment is subsequently progressed, nanotubes corresponding to the size of the fine pores may be formed in the fine pores.

The porous inorganic oxide membrane may be formed of any inorganic oxide membrane having a plurality of pores of a size corresponding to the nanotube, and for example, it may include silica, alumina, titanita, ceria, zirconia, or a combination thereof. Besides, any previously known or available porous inorganic oxide membrane may be used.

Further, as the immersion is progressed under reduced viscosity because the non-carbonaceous material modified with the organic functional group is dissolved in a solvent in the previous process, the solution may be properly penetrated into the fine pores on the porous inorganic oxide membrane.

After the immersion, the porous inorganic oxide membrane immersed in the non-carbonaceous material solution is heat treated.

By the heat treatment, the non-carbonaceous material such as silicon, germanium or antimony, and the like may be bonded along the inner wall of the fine pores of the porous inorganic oxide membrane, thus forming nanotubes. And, the organic functional group may be decomposed or removed, or only carbon may remain to form an amorphous carbon layer on the nanotube. The formed carbon layer may inhibit a direct reaction of the non-carbonaceous material and the inorganic oxide membrane that makes up the porous film, thus enabling heat treatment at high temperature. And, it may render the non-carbonaceous material not easily dissolved in an acidic or basic aqueous solution in the subsequent removal of the porous inorganic oxide membrane, The heat treatment may be conducted at about 600~1000, preferably about 700~1000, more preferably about 800~1000. As the heat treatment is progressed within the above temperature range, the above explained nanotube and negative-electrode active material comprising the same may be effectively formed, and a reaction of the non-carbonaceous material and the carbon layer, and the like may be inhibited. For example, reacting of the non-carbonaceous material of silicon, and the like and the carbon layer to form nonconductor SiC, and the like may be prevented.

Further, the heat treatment may be conducted under vacuum or inert atmosphere, which may prevent side reactions. The inert atmosphere may include argon or nitrogen atmosphere, but not limited thereto.

Meanwhile, before the heat treatment, the porous inorganic oxide membrane that is immersed in the non-carbonaceous material solution may be dried (or primarily heat treated) at about 100~200, preferably about 100~180, more preferably about 100~160. By progressing the above explained high temperature heat treatment after progressing the drying or primary heat treatment, nanotubes may be more effectively formed in the pores of the porous inorganic oxide membrane pores.

After the heat treatment, the porous inorganic oxide membrane is removed. Thereby, nanotubes may be formed, and a carbon layer may be selectively formed on the nanotube.

The removal of the porous inorganic oxide membrane may be progressed by adding acidic material such as HF or basic material such as sodium hydroxide or potassium hydroxide to a product obtained by the heat treatment. The removal may be conducted for a time suitable for completely removing the porous inorganic oxide membrane as possible, for example, for about 2 to 5 hours, preferably about 2 to 4 hours, more preferably about 2 to 3 hours.

By the above explained preparation method, the above explained nanotube and negative-electrode active material for a lithium secondary battery according to one embodiment of the invention may be prepared.

The negative-electrode active material for a lithium secondary battery may be useful for a negative-electrode of an electrochemical cell such as a lithium secondary battery. The lithium secondary battery comprises a negative electrode comprising the negative-electrode active material, a positive-electrode comprising positive-electrode active material, and electrolyte.

The negative-electrode may be prepared by mixing the negative-electrode active material for a lithium secondary battery, a conductive material, a binder and a solvent to prepare a negative-electrode active material composition, and then, directly coating on a copper current collector, and drying. Alternatively, it may be prepared by casting the negative-electrode active material composition on a separate support, and then, laminating a film obtained by delamination from the support on an aluminum current collector.

The conductive material may include carbon black, graphite, or metal powder, and the binder may include vinylidene-fluoride/hexafluoropropylene copolymer, polyvinylidene-fluoride, polyacrylonitrile, polymethylmethacrylate, polytetrafluoroethylene, and a mixture thereof, but not limited thereto. The solvent may include N-methylpyrrolidone, acetone, tetrahydrofuran, decane, and the like, but note limited thereto. The negative-electrode active material, conductive material and solvent may be used in an amount commonly used in a lithium secondary battery.

The positive-electrode may be prepared by mixing positive-electrode active material, a binder and a solvent to prepare a positive-electrode active material composition, and directly coating it on an aluminum current collector, or casting it on a separate support, and laminating a positive-electrode active material film delaminated from the support on a copper current collector. If necessary, the positive-electrode active material composition may further comprise conductive material.

As the positive-electrode active material, material capable of intercalation/deintercalation of lithium may be used, specifically, metal oxide, lithium complex metal oxide, lithium complex metal sulfide, and lithium complex metal nitride, and the like may be used, but not limited thereto.

The lithium secondary battery may further comprise a separator according to the common battery construction. As the separator, those commonly used in a lithium secondary battery may be used, for example, polyethylene, polypropylene, polyvinylidene fluoride, and a multilayer thereof may be used, and a mixed multilayer such as a polyethylene/polypropylene bi-layer separator, a polyethylene/polypropylene/polyethylene tri-layer separator, a polypropylene/polyethylene/polypropylene tri-layer separator, and the like may be used.

As the electrolyte filled in the lithium secondary battery, non-aqueous electrolyte or known solid electrolyte, and the like may be used, and those including dissolved lithium salt may be used.

A solvent for the non-aqueous electrolyte may include a cyclic carbonate such as ethylene carbonate, diethylene carbonate, propylene carbonate, butylenes carbonate, vinylene carbonate, and the like, a chain carbonate such as dimethylcarbonate, methylethylcarbonate, diethylcarbonate, and the like, ester such as methylacetate, ethylacetate, propylacetate, methylpropionate, ethylpropionate, γ-butyrolactone, and the like, ether such as 1,2-dimethoxyethane, 1,2-diethoxyethane, tetrahydrofurane, 1,2-dioxane, 2-methyltetrahydrofuran, and the like, nitrile such as acetonitrile, amide such as dimethylformamide, but not limited thereto. The solvent may be used alone or in combination. Particularly, a mixed solvent of cyclic carbonate and chain carbonate may be used.

The electrolyte may include a gel phase polymer electrolyte wherein polymer electrolyte such as polyethylene oxide, polyacrylonitrile, and the like is impregnated with an electrolytic solution, or inorganic solid electrolyte such as LiI, $Li_3N$, and the like, but not limited thereto.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlO_2$, $LiAlCl_4$, LiCl and LiI, but not limited thereto.

According to the present invention, negative-electrode active material exhibiting more excellent cycle life property and capacity property, a method for preparing the same, and a lithium secondary battery are provided.

Accordingly, a lithium secondary battery having more excellent properties may be provided using the negative-electrode active material.

Hereinafter, the present invention will be explained in detail with reference to the following examples. However, these examples are presented only to illustrate the invention, and the scope of the invention is not limited thereto.

Example

Example 1

Preparation of a Solution of Silicon Modified with a Butyl Group 30 g of $SiCl_4$ (purity 99.999%, Aldrich) and 200 g of a tri(ethylene glycol dimethyl ether) solvent were completely mixed, and then, the mixed solution was added to a solution of sodium naphthalide (100 g). The obtained solution was heated at 400 for 9 hours with refluxing. The solution was mixed with 90 Ml of butyl lithium (99%), and stirred overnight. At this time, n-butyl lithium was reacted with $SiCl_4$ to form silicon modified with a butyl group. The solvent and naphthalene were removed by heating to 120 under vacuum, using a rotary evaporator, and NaCl and LiCl by-products were removed by partitioning with an excessive amount of n-hexane and water. The obtained product, silicon modified with a butyl group, was a light yellow viscous gel, to which n-hexane was added to decrease viscosity and form a solution of silicon modified with a butyl group.

Preparation of Negative-Electrode Active Material
for Lithium Secondary Battery

A porous anodized alumina membrane (Whatman, Anodisc, φ~200-250 nm) was immersed in the solution of silicon modified with a butyl group at 25° C. for 2 minutes, and dried and heat treated at 200° C. for 2 hours under vacuum. This process (immersion and drying) was repeated additional 3 times to obtain a silicon-butyl/alumina nanotube complex. The complex was further heat treated at 1000° C. for 3 hours. The product obtained by the heat treatment was treated with a diluted aqueous solution of 3M NaOH for 2 hours, and washed several times with distilled water and ethanol, thereby removing the porous alumina membrane from the complex. Finally, the product was vacuum dried at 120° C. overnight to obtain nanotubes. The nanotube was measured to have an average diameter of approximately 230 nm, an outer wall thickness of about 20 nm, and a length of about 40 μm, and it was observed that a carbon layer with a thickness of 1 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 1.

Example 2

Preparation of Negative-Electrode Active Material
for Lithium Secondary Battery

A porous anodized alumina membrane (Whatman, Anodisc, φ~300 nm) was used, and it was immersed in a solution of silicon modified with a butyl group, prepared by the same method as Example 1, at 25° C. for 2 minutes. Subsequently, the resultant product was dried and heat treated at 150° C. for 12 hours. This process (immersion and drying) was repeated additional 4 times to obtain a silicon-butyl/alumina nanotube complex. The complex was further heat treated at 900° C. for 3 hours under vacuum. The resultant product obtained by the heat treatment was treated with an aqueous solution of 3M NaOH for 6 hours, and washed several times with distilled water and ethanol, thereby removing the porous alumina membrane from the complex. Finally, the product was vacuum dried at 100° C. overnight to obtain nanotubes. The nanotube was measured to have an average cross section diameter of approximately 180 nm, an outer wall thickness of about 30 nm, and a length of about 10 μm, and it was observed that a carbon layer with a thickness of 2 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 2.

Example 3

Preparation of Negative-Electrode Active Material
for a Lithium Secondary Battery A porous anodized alumina membrane (Whatman, Anodisc, φ~300 nm) was used, and it was immersed in a solution of silicon modified with a butyl group, prepared by the same method as Example 1, at 25° C. for 2 minutes. Subsequently, the resultant product was dried and heat treated at 200° C. for 1 hour. This process (immersion and drying) was repeated additional 3 times to obtain a silicon-butyl/alumina nanotube complex. The complex was further heat treated at 1000° C. for 3 hours under vacuum. The resultant product obtained by the heat treatment was treated with an aqueous solution of 6M NaOH for 5 hours, and washed several times with distilled water and ethanol, thereby removing the porous alumina membrane from the complex. Finally, the product was vacuum dried at 100° C. overnight to obtain nanotubes. The nanotube was measured to have an average cross section diameter of approximately 250 nm, an outer wall thickness of about 30 nm, and a length of about 1 μm, and it was observed that a carbon layer with a thickness of 3 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 3.

Example 4

Preparation of a Solution of Germanium (Ge)
Modified with a Butyl Group

A solution of germanium modified with a butyl group was prepared by the same method as Example 1, except using $GeCl_4$ (purity 99.9%, Alpha) instead of $SiCl_4$ (purity 99.999%, Aldrich)

Preparation of Negative-Electrode Active Material
for Lithium Secondary Battery

A porous anodized alumina membrane (Whatman, Anodisc, φ 200-250 nm) was used, and it was immersed in a solution of germanium modified with a butyl group at 25° C. for 2 minutes. Subsequently, the resultant product was dried and heat treated at 100° C. for 9 hours under vacuum. This process (immersion and drying) was repeated additional 3 times to obtain a germanium-butyl/alumina nanotube complex. The complex was further heat treated at 800° C. for 3 hours under vacuum. The resultant product obtained by the heat treatment was treated with a diluted aqueous solution of 3M NaOH for 9 hours, and washed several times with distilled water and ethanol, thereby removing the porous alumina membrane from the complex. Finally, the product was vacuum dried at 100° C. overnight to obtain nanotubes. The nanotube was measured to have an average cross section diameter of approximately 280 nm, an outer wall thickness of about 20 nm, and a length of about 10 μm, and it was observed that a carbon layer with a thickness of 2 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 4.

Example 5

Preparation of Negative-Electrode Active Material
for a Lithium Secondary Battery A porous anodized alumina membrane (Whatman, Anodisc, φ 200-250 nm) was used, and it was immersed in a solution of germanium modified with a butyl group, prepared by the same method as Example 4, at 25° C. for 2 minutes. Subsequently, the resultant product was dried and heat treated at 100° C. for 9 hours under vacuum. This process (immersion and drying) was repeated additional 2 times to obtain a germanium-butyl/alumina nanotube complex. The complex was further heat treated at 700° C. for 6 hours under vacuum. The resultant product obtained by the heat treatment was treated with a diluted aqueous solution of 3M NaOH for 9 hours, and washed several times with distilled water and ethanol, thereby removing the porous alumina membrane from the complex. Finally, the product was vacuum dried at 100° C. overnight to obtain nanotubes. The nanotube was measured to have an average cross section diameter of approximately 250 nm, an outer wall thickness of about 15 nm, and a length of about 20 µm, and it was observed that a carbon layer with a thickness of 1 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 5.

Example 6

Preparation of a Solution of Antimony (Sb) Modified with a Butyl Group

A solution of antimony modified with a butyl group was prepared by the same method as Example 1, except using $SbCl_5$ (purity 99.9%, Alpha) instead of $SiCl_4$ (purity 99.999%, Aldrich).

Preparation of Negative-Electrode Active Material for Lithium Secondary Battery

A porous anodized alumina membrane (Whatman, Anodisc, φ 200-350 nm) was used, and it was immersed in a solution of antimony modified with a butyl group at room temperature for 10 minutes. Subsequently, the resultant product was dried and heat treated at 100° C. for 1 hour under vacuum. This process (immersion and drying) was repeated additional 2 times to obtain an antimony-butyl/alumina nanotube complex. The complex was further heat treated at 650° C. for 5 hours under vacuum. The resultant product obtained by the heat treatment was treated with a diluted aqueous solution of 6M NaOH for 5 hours, and washed several times with distilled water and ethanol, thereby removing the porous alumina membrane from the complex. Finally, the product was vacuum dried at 600° C. overnight to obtain nanotubes. The nanotube was measured to have an average cross section diameter of approximately 200 nm, an outer wall thickness of about 20 nm, and a length of about 5 µm, and it was observed that a carbon layer with a thickness of 1 nm was formed on the inner side and outer side of the outer wall. It was also observed that the nanotubes were obtained in the form of a nanotube bundle wherein the nanotubes are gathered in a bundle shape and regularly arranged and bonded. The nanotube was designated as negative-electrode active material of Example 6.

Reference Example 1

A ball milling was conducted using silicon powder (Sigma Aldrich, 20 micron) and natural graphite at 800 rpm for 8 hours, thereby preparing carbon-coated silicon particles, which were used as negative-electrode active material for a lithium secondary battery. The weight ratio of carbon and silicon in the carbon-coated silicon particles was 44:56.

Analysis of Structure and Morphology of Negative-Electrode Active Material Comprising Nanotubes Scanning electron microscope (SME) photographs of the nanotube included in the negative-electrode active material for a lithium secondary battery prepared in Example 1 are shown in FIGS. 2a to 2c. FIG. 2a is a photograph of the entire shape of the nanotube bundle formed of gathered nanotubes, and FIG. 2b is a photograph from the top, showing the end opening of the nanotube, and FIG. 2c is a photograph from the side. As the result of analyzing the SEM photographs, it was confirmed that the nanotube has a cross section diameter of about 200~250 nm (average cross section diameter: 230 nm), an outer wall thickness of about 20 nm, and a length of 40 µm (The nanotubes may be separated by ultrasonic treatment of the nanotube bundle, and thereby, the cross section diameter, outer wall thickness and length, and the like may be more specifically measured).

Figure 2D:
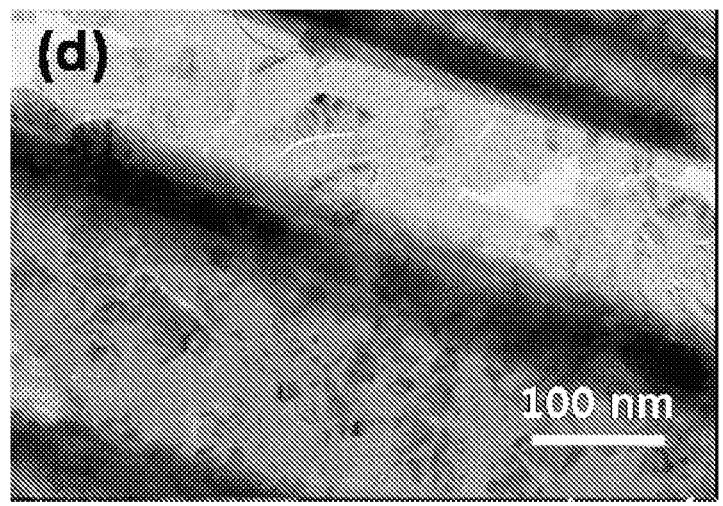
Figure 2E:
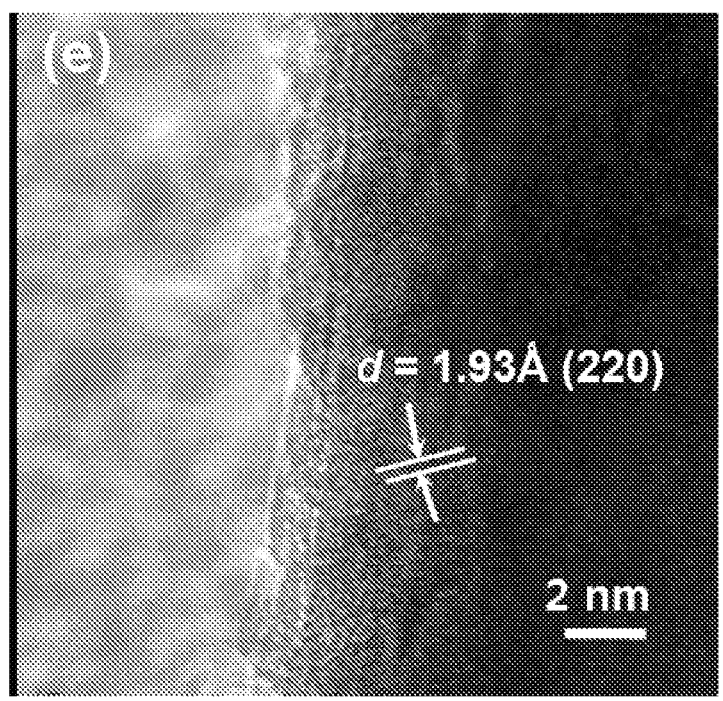
Figure 2F:
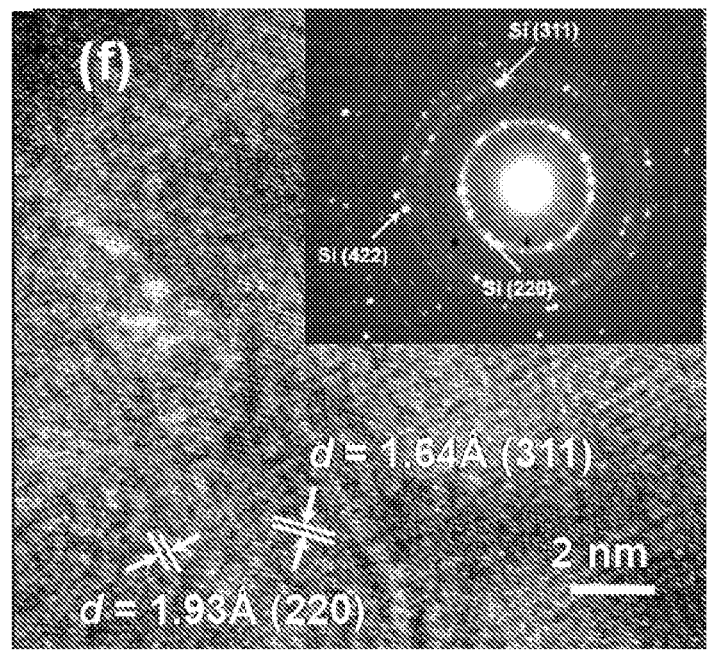

And, the nanotube of Example 1 was analyzed by high-resolution transmission electron microscope (TEM) and X-ray diffraction, and the results are shown in FIGS. 2d to 2f. FIG. 2d is a TEM image of the outer wall of the nanotube, FIG. 2e is a high-resolution TEM (HR-TEM) image of the outer wall end, and FIG. 2f is an HR-TEM image of the inner side of the outer wall. And, the inserted drawing in FIG. 2f is X-ray diffraction pattern of the inner side of the outer wall.

Referring to FIG. 2e, weak lattice fringe of a side corresponding to d spacing of 1.93 Å (220) may be observed, indicating that the outer side of the outer wall is covered with an amorphous silicon phase. FIG. 2f shows the inner side of the outer wall, enlarged with high magnification, wherein diffraction pattern and lattice fringe images of the corresponding area confirm existence of silicon phase. And, the X-ray diffraction pattern of the nanotube shows the existence of silicon phase of a cubic crystal form such as diamond.

Analysis of Raman Spectrum

Figure 3:
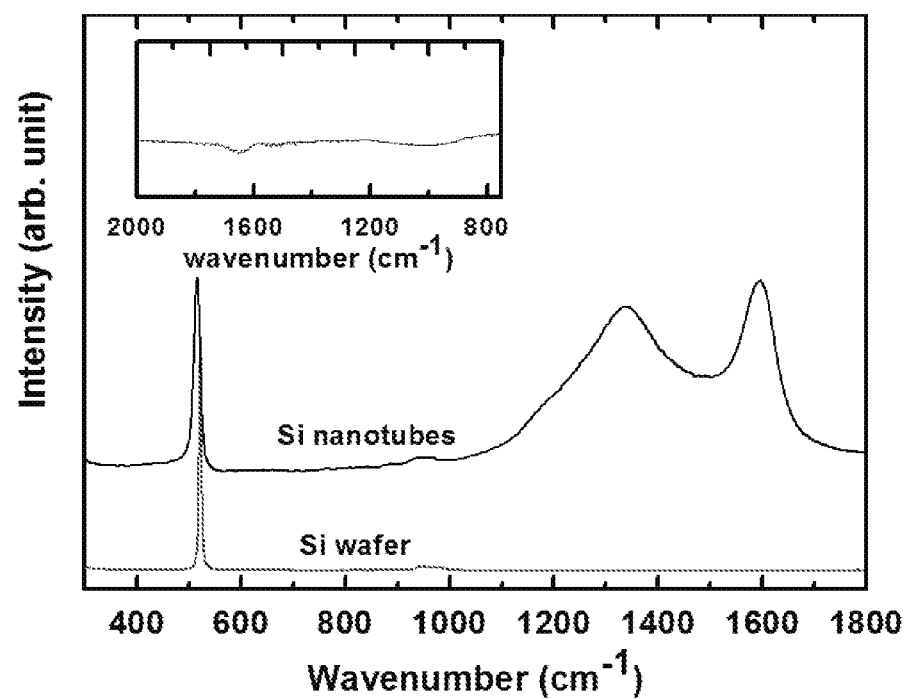
FIG. 3 shows Raman spectrum and FT-IR spectrum of the nanotube included in the negative-electrode active material of Example 1.

FIG. 3 shows Raman spectrum analysis result of the nanotube obtained in Example 1. In this spectrum, a strong sharp peak at ~516 $cm^{-1}$ is related to a Si—Si stretching mode, and it is very similar to the Raman spectrum of the silicon wafer of control. A small peak at ~957 $cm^{-1}$ represents an amorphous Si—Si stretching mode, and it is also observed in the silicon wafer. Two different peaks at ~1360 and ~1580 $cm^{-1}$ respectively represent D band (disordered band) and G band (graphene band). It is confirmed that as silicon is modified with a butyl group during the preparation process, although dependent upon heat treatment temperature, the butyl group forms a carbon layer and is included in the nanotube. Dimensional ratio of the D and G bands of the sample may be evaluated as 1.4 However, this value is much smaller than the values of $Sn_{0.9}Si_{0.1}$ nanoparticle and carbon coated silicon nanoparticle having ratio of 2 or more.

Further, the inserted drawing of FIG. 3 shows FT-IR spectrum of the nanotube. Referring to this, no peak exists at 1000-1100 $cm^{-1}$, indicating that there is no effective Si—O chemical bond. And, it is considered that the prepared nanotube is very pure with FT-IR detection limit of less than 100 ppm. These results indicate that the nanotube is covered with a very thin amorphous carbon layer.

Analysis of Structure and Morphology of Nanotube and Negative-Electrode Active Material Comprising the Same after Charge/Discharge of Lithium Secondary Battery To confirm whether the morphology of the nanotube obtained in Example 1 changes after 200 cycles of charge/discharge of the lithium secondary battery, a negative-electrode was separated from the battery, and the negative-electrode active material and the nanotube included therein were examined by SEM and TEM. More specifically, according to the method described in the following Examples 7 to 12, 200 cycles of charge/discharge were performed at 1 C, 0-1.5V using a half cell, and then, the negative-electrode was separated and examined.

Figure 5:
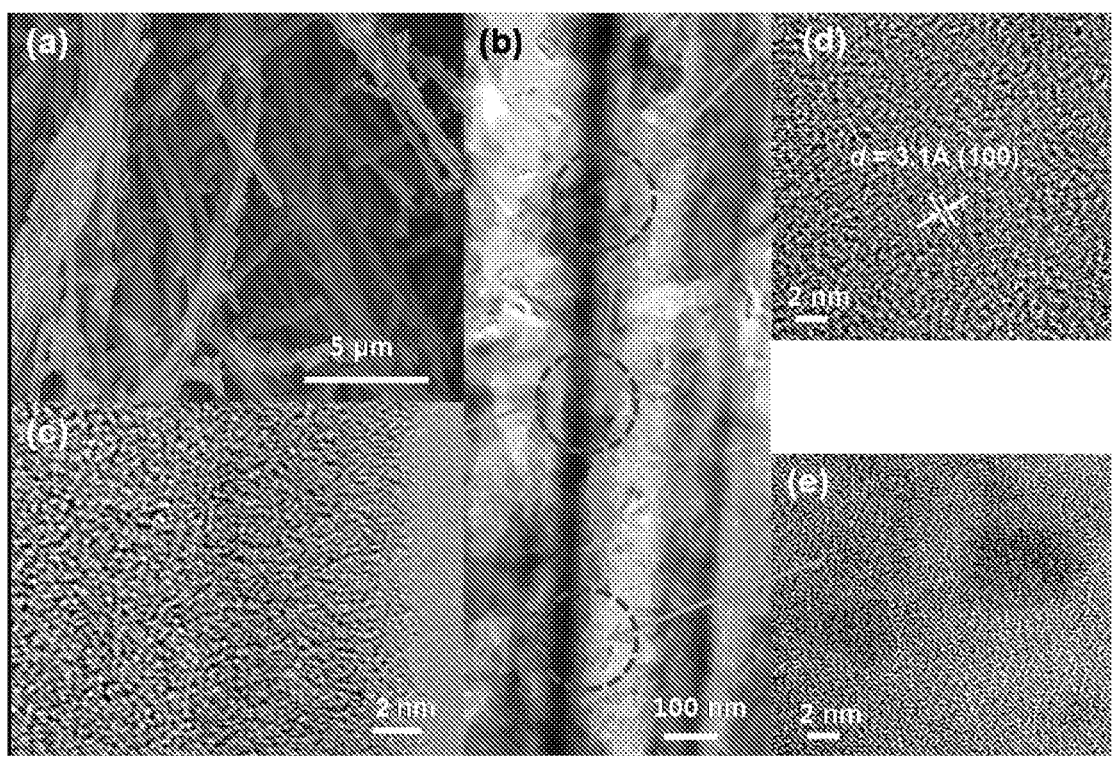
FIG. 5 shows SEM photograph and TEM image of the nanotube, after performing 200 cycles of charge/discharge using a lithium secondary battery including the negative-electrode active material of Example 1.

FIG. 5 (a) represents an SEM photograph of the nanotube after performing 200 cycles of charge/discharge, (b) represents a TEM image of the nanotube, and (c) to (e) represent HR-TEM images of (b) at different three points.

Referring to FIG. 5 (a), it is confirmed that the morphology of the nanotube is clearly maintained after 200 cycles of charge/discharge. And, FIGS. 5 (b) to (e) represent a predominant amorphous phase, which coincides with the previous results. However, formation of silicon nanocrystal with a particle diameter of <5 nm appears on the amorphous silicon matrix.

When crystal growth cannot be achieved from a thermodynamically preferable crystal intermediate compound, an amorphous state is generated, and a metastable amorphous phase with lower free energy than a pure reactant is formed. However, it was observed in the negative-electrode after 80 cycles that silicon nanocrystal may be reformed after long cycles of charge/discharge. Although the X-ray diffraction pattern of 80 cycle charged/discharged silicon electrode (after charged at 1.5V) generally shows an amorphous state, the HR-TEM image shows the existence of silicon nanocrystal with a particle diameter of less than 5 nm.

Further, referring to FIGS. 5 (a) to (c), it is confirmed that the outer wall thickness of the nanotube became about 40 nm and the average cross section diameter became about 300 nm after 200 cycles of charge/discharge. By the change of the outer wall thickness and morphology maintenance of the nanotube, it is confirmed that volume change at charge/discharge may be effectively absorbed.

Examples 7~12

Manufacture of Half Cell

The negative-electrode active material for a lithium secondary battery prepared according to Examples 1~6, super P carbon black and a poly(vinylidene fluoride) binder were mixed at a weight ratio of 80:10:10 in a solvent of N-methylpyrrolidone to prepare a negative-electrode active material slurry. The prepared negative-electrode active material slurry was coated on a copper foil of a thickness of 50 μm, dried at 150 for 20 minutes, and then, roll-pressed to manufacture a negative-electrode.

Using the negative-electrode, a lithium counter electrode, a microporous polyethylene separator and electrolyte, a coin type half cell (2016 R-type) was manufactured in a glove box filled with helium. The half cells manufactured using the negative-electrode active material of Examples 1~6 were respectively designated as half cells of Examples 7~12.

As the electrolyte of the half cells, 1.05M $LiPF_6$ was dissolved in a mixed solvent of ethylene carbonate, diethylene carbonate and ethyl-methyl carbonate with a volume ratio of 30:30:40, and used.

Manufacture of Pouch Type Lithium Ion Battery (Full Cell)

Using the same negative-electrode as the half cell, a positive-electrode (positive-electrode active material: $LiCoO_2$), a polyethylene separator and electrolyte, a lithium ion battery (full cell) was manufactured by a common method. Identically to the half cell, 1.05M $LiPF_6$ was dissolved in a mixed solvent of ethylene carbonate, diethylene carbonate and ethyl-methyl carbonate with a volume ratio of 30:30:40, and used as the electrolyte. The lithium ion batteries manufactured using the negative-electrode active material of Examples 1~6 were respectively designated as full cells of Examples 7~12.

Reference Example 2

Half cell and full cell of Reference Example 2 were manufactured by the same method as Examples 7~12, except using the negative-electrode active material for a lithium secondary battery prepared according to Reference Example 1.

Charge/Discharge Property and Coulomb Efficiency

Figure 4A:
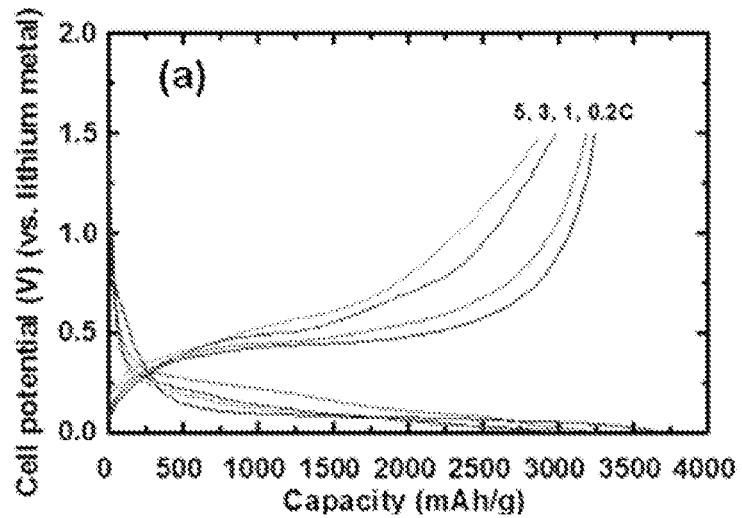
FIGS. 4a to 4d are graphs showing the measurement results after performing charge/discharge using a lithium secondary battery including the negative-electrode active material of Example 1.

With the half cells manufactured in Example 7 using the negative-electrode active material of Example 1, charge/discharge was performed respectively at 0.2, 1, 3 and 5 C, 0 to 1.5V, and the measurement result of the charge/discharge property was shown in FIG. 4a. And, each 20, 40, 80 cycle charge/discharge was performed at 1 C, 0 to 1.5V, and the measurement result of the charge/discharge property was shown in FIG. 4b.

Figure 4B:
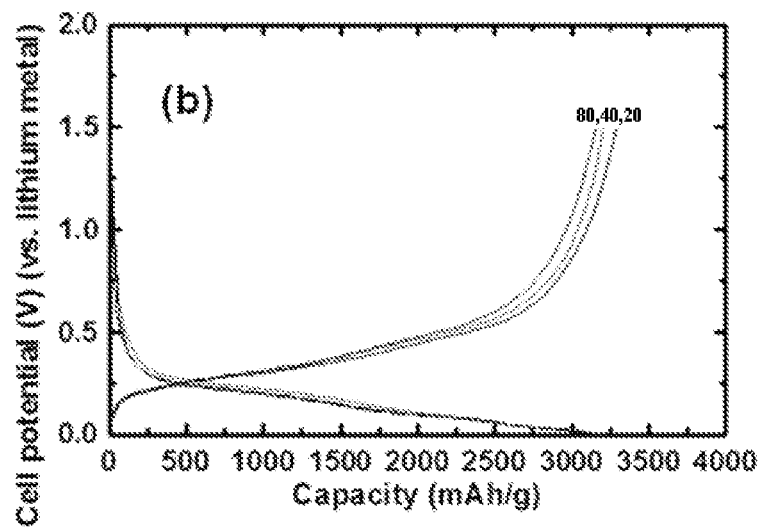
Figure 4C:
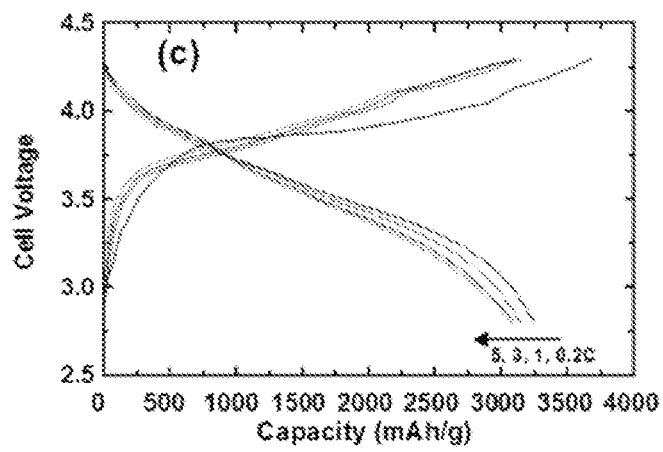
Figure 4D:
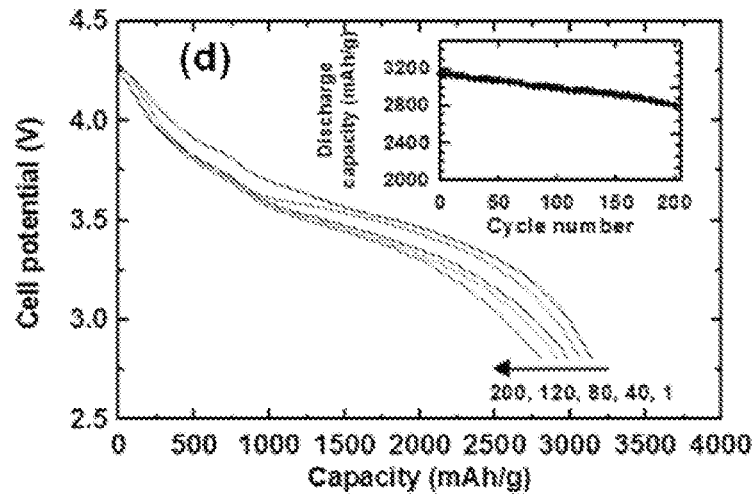

Further, using the full cell manufactured in Example 7, 200 cycle charge/discharge was performed respectively at 0.2, 1, 3 and 5 C, 2.75 to 4.3V, and the measurement result of the charge/discharge property was shown in FIG. 4c; and, each 1, 40, 80, 120 and 200 cycle charge/discharge was performed at 1 C, 2.75 to 4.3V, and the measurement result of the charge/discharge property was shown in FIG. 4d (1 C=3000 mA/g). And, the inserted drawing of FIG. 4d is a graph showing the change tendency of discharge capacity according to cycle number of charge/discharge at 1 C.

Referring to FIGS. 4a and 4b, the cell of Example 7 has initial discharge and charge capacity of 3648 and 3247 mAh/g, confirming 89% Coulomb efficiency. And, charge capacity at 5 C is 2878 mAh/g, confirming 89% capacity retention ratio. In addition, it is also confirmed in FIG. 4b that 3000 mAh/g of charge capacity and thus high capacity retention ratio are exhibited even after 80 cycles.

Further, referring to FIGS. 4c and 4d, it is confirmed that even when the lithium ion battery is charged/discharged at 3 and 5 C, capacity property exceeds 3000 mAh/g, and that even after 200 cycle charge/discharge, capacity retention ratio at 10 charge/discharge reaches 89% (2804 mAh/g vs 3142 mAh/g).

From the experiment results of charge/discharge property, it is confirmed that the negative-electrode active material including nanotubes of Example 1 and the lithium secondary battery comprising the same of Example 7 exhibit very excellent capacity property, capacity retention ratio, cycle life property and high rate property, and the like, compared to the previously known active material and lithium secondary battery.

Next, with the half cells manufactured in Examples 8 to 12 and Reference Example 2 using the negative-electrode active material of Examples 2 to 6 and Reference Example 1, each 80 cycle charge/discharge was performed at 1 C, 0 to 1.5V. The initial charge capacity, Coulomb efficiency and charge capacity after 80 cycle charge/discharge of each half cell are described in the following Table 1.

TABLE 1

|  | NEGATIVE-ELECTRODE ACTIVE MATERIAL | INITIAL CHARGE CAPACITY (MAH/G) | COULOMB EFFICIENCY (%) | CAPACITY AFTER 80 CYCLES (MAH/G) |
|---|---|---|---|---|
| EXAMPLE 8 | EXAMPLE 2 | 3200 | 89 | 3050 |
| EXAMPLE 9 | EXAMPLE 3 | 3150 | 89 | 3000 |
| EXAMPLE 10 | EXAMPLE 4 | 1450 | 90 | 1380 |
| EXAMPLE 11 | EXAMPLE 5 | 1420 | 90 | 1350 |
| EXAMPLE 12 | EXAMPLE 6 | 650 | 88 | 600 |

TABLE 1-continued

| | NEGATIVE-ELECTRODE ACTIVE MATERIAL | INITIAL CHARGE CAPACITY (MAH/G) | COULOMB EFFICIENCY (%) | CAPACITY AFTER 80 CYCLES (MAH/G) |
|---|---|---|---|---|
| REFERENCE EXAMPLE 2 | REFERENCE EXAMPLE 1 | 1900 | 87 | 700 |

Referring to Table 1, it is confirmed that the half cells of Examples 8 to 12 exhibit capacity property and Coulomb efficiency similar to or more excellent than previously known nanocomplex of carbon and silicon, and particularly, exhibit remarkably excellent cycle life property and capacity retention ratio. Namely, as the half cells of Examples 8 to 12 include negative-electrode active material comprising nanotubes consisting of silicon, germanium or antimony, and the like, they may effectively absorb volume change at charge/discharge to exhibit largely improved cycle life property and capacity retention ratio.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative-electrode active material for a lithium secondary battery, comprising:
   a non-carbonaceous nanotube having an outer wall and a tube shape defined by the outer wall, wherein the outer wall has a thickness of nanoscale and comprises at least one non-carbonaceous material selected from the group consisting of silicon, germanium and antimony; and
   an amorphous carbon layer with a thickness of 5 nm or less on the outer wall of the non-carbonaceous nanotube,
   wherein the non-carbonaceous nanotube has an average cross-section diameter of 180-300 nm.

2. The negative-electrode active material for lithium secondary battery according to claim 1, wherein the outer wall has a thickness of 10-30 nm.

3. The negative-electrode active material for lithium secondary battery according to claim 1, wherein the nanotube has a length of 1-50 μm.

4. The negative-electrode active material for lithium secondary battery according to claim 1, wherein the outer wall has a thickness of 20-60 nm after performing 200 cycles of charge/discharge.

5. The negative-electrode active material for lithium secondary battery according to claim 1, wherein the nanotube has an average cross-section diameter of 200-350 nm after performing 200 cycles of charge/discharge.

6. The negative-electrode active material for lithium secondary battery according to claim 1, wherein the amorphous carbon layer is formed on the outer side and/or inner side of the outer wall, and has a thickness of 1-5 nm.

7. The negative-electrode active material for lithium secondary battery according to claim 1, wherein the outer wall includes amorphous non-carbonaceous material on an outer side of the outerwall.

8. The negative-electrode active material for lithium secondary battery according to claim 1, wherein the outer wall includes non-carbonaceous material of a cubic crystalline form on an inner side of the outerwall.

9. The negative-electrode active material for lithium secondary battery according to claim 1, wherein the outer wall has a morphology where nanocrystals are dispersed in an amorphous matrix of the non-carbonaceous material, after performing 200 cycles of charge/discharge.

10. The negative-electrode active material for lithium secondary battery according to claim 9, wherein the nanocrystal of the non-carbonaceous material has an average particle diameter of 1-10 nm.

11. The negative-electrode active material for lithium secondary battery according to claim 1, wherein the outer wall includes substantially pure non-carbonaceous material containing less than 100 ppm of impurities.

12. The negative-electrode active material for lithium secondary battery according to claim 1, wherein the negative-electrode active material comprises a nanotube bundle including a plurality of nanotubes.

13. A method for preparing the negative-electrode active material for a lithium secondary battery according to claim 1, comprising:
    modifying the at least one non-carbonaceous material selected from the group consisting of silicon, germanium and antimony with an organic functional group;
    immersing a porous inorganic oxide membrane in a solution of the non-carbonaceous material modified with the organic functional group;
    heat-treating the immersed porous inorganic oxide membrane; and
    removing the porous inorganic oxide membrane.

14. The method according to claim 13, wherein the organic functional group is an organic group represented by $C_nH_m$, and n and m are respectively an integer of 1 or more.

15. The method according to claim 14, wherein the organic functional group is a hydrocarbon organic group selected from the group consisting of a $C_{1-30}$ aliphatic organic group, a $C_{3-30}$ cycloaliphatic organic group and a $C_{6-30}$ aromatic organic group.

16. The method according to claim 13, wherein the porous inorganic oxide membrane includes at least one selected from the group consisting of silica, alumina, titania, ceria and zirconia.

17. The method according to claim 13, wherein the heat treatment is conducted at 600-1000° C.

18. The method according to claim 17, further comprising drying the porous inorganic oxide membrane immersed in the solution of the non-carbonaceous material at 100-200° C. before the heat treatment.

19. The method according to claim 13, wherein removing of the porous inorganic oxide membrane is conducted using basic or acidic material.

20. A lithium secondary battery comprising
    a positive-electrode including positive-electrode active material;
    a negative-electrode including the negative-electrode active material according to claim 1; and
    electrolyte.

* * * * *